United States Patent [19]

Kamoto

[11] 4,232,371
[45] Nov. 4, 1980

[54] APPARATUS FOR INDICATING THE AMOUNT OF TAPE WOUND UPON A REEL

[75] Inventor: Hidetoshi Kamoto, Tokyo, Japan

[73] Assignee: Sony Corporation, Tokyo, Japan

[21] Appl. No.: 963,319

[22] Filed: Nov. 24, 1978

[30] Foreign Application Priority Data

Dec. 29, 1977 [JP] Japan ................................. 52-158870

[51] Int. Cl.³ ............................................. G06F 15/20
[52] U.S. Cl. ................................. 364/561; 242/75.47;
242/75.51; 242/186; 242/191; 235/92 DN
[58] Field of Search ..................... 364/561, 562;
235/92 DN, 92 PD, 92 CV, 92 EA, 92 PE, 92
TF; 242/75.51, 186, 191, 75.47

[56] References Cited

U.S. PATENT DOCUMENTS

| 3,151,507 | 10/1964 | Canova et al. ............................ 80/32 |
| 3,214,110 | 10/1965 | Ross .................................... 242/75.47 |
| 3,248,621 | 4/1966 | Carter et al. ............................. 318/6 |
| 3,518,857 | 7/1970 | Hancock et al. .......................... 72/8 |
| 3,553,992 | 1/1971 | Harbaugh ................................. 72/9 |
| 3,564,219 | 2/1971 | Mutziger ................................. 235/92 |
| 4,052,599 | 10/1977 | Whiteley et al. ................ 364/562 X |
| 4,151,403 | 4/1979 | Woolston ......................... 364/562 X |

Primary Examiner—Edward J. Wise
Attorney, Agent, or Firm—Lewis H. Eslinger; Alvin Sinderbrand

[57] ABSTRACT

Apparatus is provided for indicating the amount of tape wound upon a reel, such as a supply reel or a take-up reel, in a two-reel cartridge when the cartridge is loaded into a processing device of the type which includes a loading device for withdrawing from the cartridge a portion of the tape wound upon the reel. A signal is generated representing the angular velocity of the reel when that reel rotates in response to the withdrawal of tape from the cartridge. This generated signal is combined with predetermined signals representing predetermined characteristics of the tape, the combined signals then being used to indicate the amount of tape which is wound upon the reel. In a preferred embodiment, the predetermined signals are: v, the velocity of the tape as it is unwound from the reel; δ, the thickness of the tape; $R_H$, the diameter of the innermost winding of the tape upon the reel; and the signal which represents the angular velocity of the tape is $P_S$. A micro-processor having an arithmetic section combines, or operates upon these signals in accordance with the expression $$T_s = \frac{v}{4\pi\delta}\left[\frac{1}{P_S^2} - \left(\frac{2\pi R_H}{v}\right)^2\right].$$

wherein $T_S$ is the amount of tape wound upon the reel in terms of time. A particular application of this apparatus is in a video tape recorder having a guide drum about which the withdrawn portion of tape is deployed during the loading thereof, the amount of tape remaining in the cartridge for recording or playback being indicated by this apparatus.

12 Claims, 5 Drawing Figures

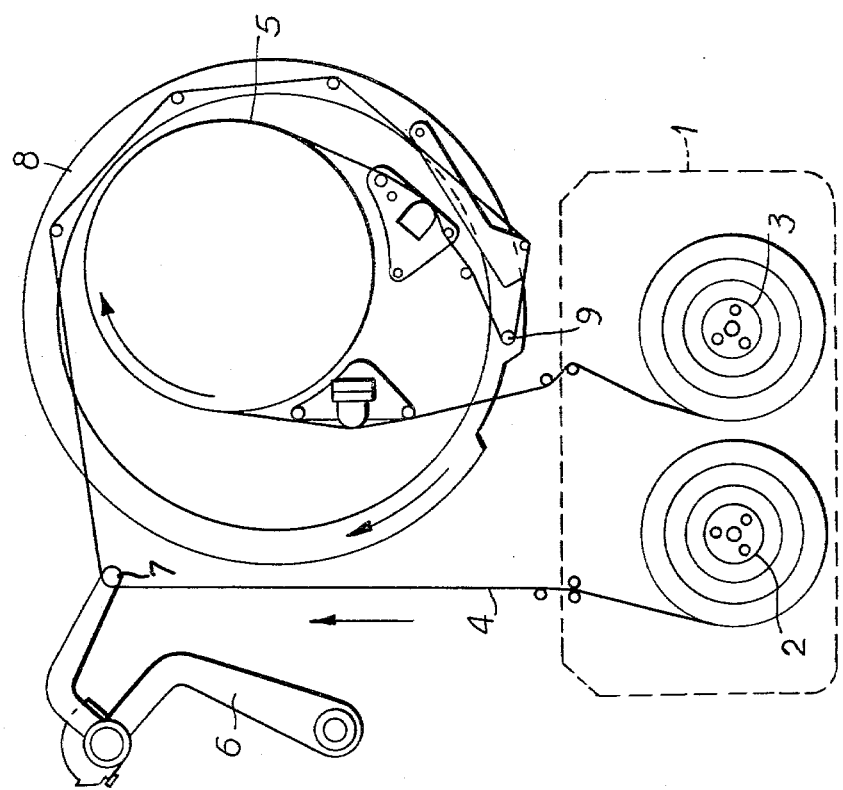
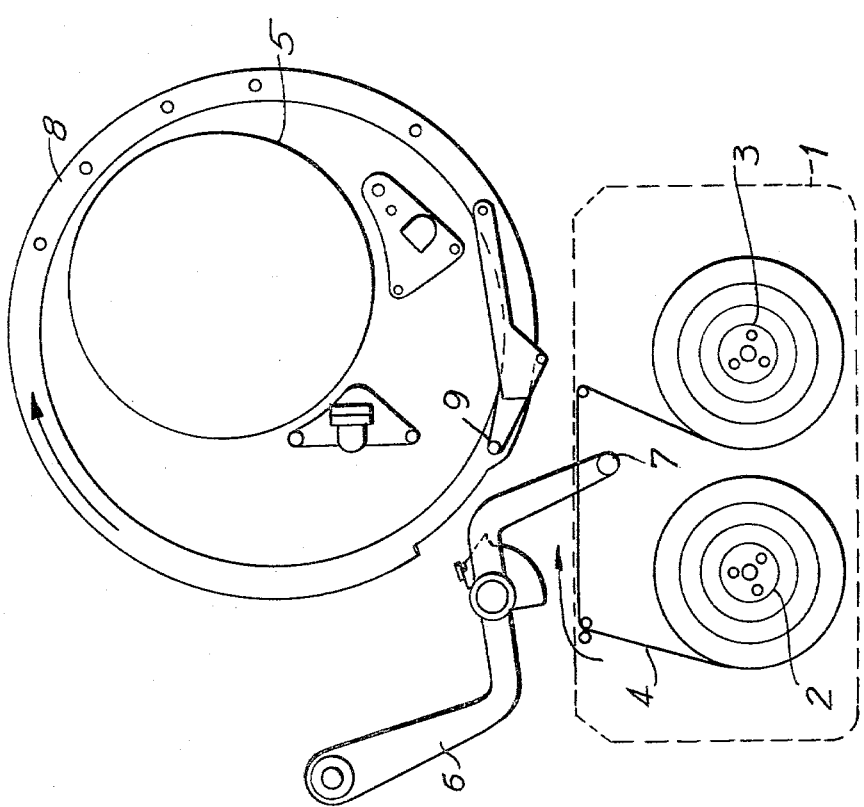

APPARATUS FOR INDICATING THE AMOUNT OF TAPE WOUND UPON A REEL

BACKGROUND OF THE INVENTION

This invention relates to apparatus for indicating the amount of tape wound upon a reel, such as a supply reel or a take-up reel in a two-reel cartridge and, more particularly, to such apparatus wherein this indication is provided after the reel is rotated one or more times while tape is transported therefrom, such as during a loading operation wherein the transported tape is withdrawn from the cartridge and into a processing device.

In tape recording/reproducing apparatus, such as in audio tape recorders, video tape recorders (VTR's), and the like, an indicator usually is provided to indicate either the amount of tape which has been transported from a supply reel to a take-up reel, or the amount of tape which remains on the supply reel during, for example, recording or reproducing operations. Such indicators typically are digital counters which provide a so-called tape count that is incremented or decremented by the forward or reverse movement, respectively, of tape through the recorder/reproducer. If a fresh tape, that is, a tape which is completely wound upon the supply reel, is loaded into the device, then the tape counter provides a reasonably close approximation of the amount of tape which has been consumed (i.e., the amount of tape which has been transported from the supply reel) or the amount of tape which remains for further recording or reproduction.

However, if a tape cartridge that has been partially used, that is, some amount of tape already has been used for recording or reproduction, is loaded into the device, the tape counter cannot indicate how much tape remains on the supply reel or how much tape already has been wound upon the take-up reel. To obtain such an indication from the tape counter requires that the present position of the tape be noted, and then the tape be rewound completely in order to set the tape counter to an initial, zero count, and then the tape must be transported back to its last position so that the amount of tape which had been used can be accounted for by the tape counter. It is appreciated that this is a time-consuming and annoying task. Nevertheless, it often is necessary for a user to be apprised of the amount of tape which remains in preparation for a recording operation, for example, so that the user can ascertain if there is a sufficient amount of tape available for his purpose.

OBJECTS OF THE INVENTION

Therefore, it is an object of the present invention to provide improved apparatus for indicating the amount of tape which is wound upon a supply or take-up reel and which avoids the aforenoted difficulties of the prior art.

Another object of this invention is to provide apparatus for indicating the amount of tape wound upon a supply or take-up reel in terms of recording (or reproducing) time.

A further object of this invention is to provide apparatus which, during an initial operation wherein tape is transported from, for example, the supply reel in a tape cartridge indicates the amount of tape which remains on that reel.

An additional object of this invention is to provide tape indicating apparatus which is particularly useful in a video tape recorder of the type which includes loading apparatus that is operative during a loading operation to withdraw a portion of tape from a cartridge and deploy that portion about a guide drum, the tape indicating apparatus providing an indication of the amount of tape which remains for a recording or a reproducing operation as soon as the tape is so deployed.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for indicating the amount of tape wound upon a reel, such as a supply reel or a take-up reel in a two-reel cartridge, when the tape is transported from the reel, such as when tape is withdrawn from the cartridge during a loading operation of the tape into a processing device. The apparatus includes a signal generator for generating a signal representing the angular velocity of the reel when that reel rotates as tape is transported therefrom. The generated signal is combined with predetermined signals representing respective characteristics of the tape, and the combined signals are used to indicate the amount of tape which is wound upon the reel.

In accordance with one aspect of this invention, the indication is in terms of time $T_S$, such as the amount of recording or reproducing time which is available; and the predetermined signals represent the tape velocity v, the tape thickness $\delta$, the angular velocity $P_S$ of the reel, and the diameter $R_H$ of the innermost winding of the tape which is wound upon that reel. A micro-processor, including an arithmetic section, combines these signals in accordance with the mathematical expression $$T_S = \frac{v}{4\pi\delta}\left[\frac{1}{P_S^2} - \left(\frac{2\pi R_H}{v}\right)^2\right].$$

A particular application of the present invention is in a video tape recorder wherein the cartridge is loaded therein and, in accordance with the usual loading operation, a portion of the tape wound upon, for example, the supply reel is withdrawn from the cartridge and deployed about the guide drum of the VTR. Once this loading operation is completed, the apparatus indicates the amount of tape remaining on the supply reel, or the amount of tape which may already have been wound upon the take-up reel.

BRIEF DESCRIPTION OF THE DRAWINGS

The following detailed description, given by way of example, will best be understood in conjunction with the accompanying drawings in which:

FIG. 1 is a schematic representation of a recording and/or reproducing device, such as a VTR, provided with a tape loading and unloading mechanism disposed to receive a tape cartridge;

FIG. 2 is a schematic representation of the tape recording and/or reproducing device with a portion of the tape withdrawn from the cartridge and loaded thereon;

DETAILED DESCRIPTION OF A PREFERRED EMBODIMENT

Figure 3:
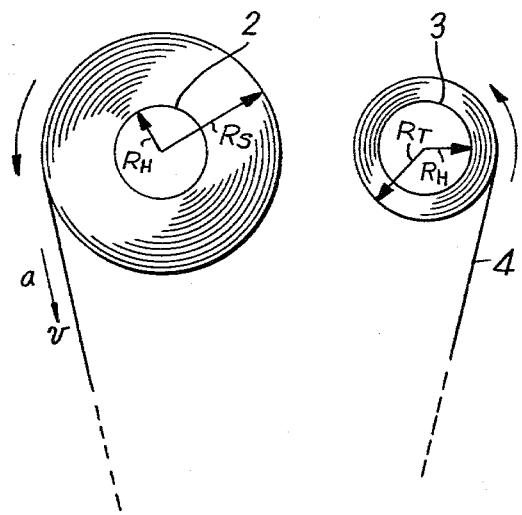
FIG. 3 is a schematic representation of the supply and take-up reels in a typical tape cartridge having particular parameters which are used by the present invention to indicate the amount of tape which is wound upon either the supply or the take-up reel.

For the purpose of the present discussion, the present invention will be described in the environment of a video tape recorder (VTR). One example of a typical VTR with which this invention is used is illustrated in FIG. 1. This VTR includes a guide drum 5 adapted to receive a portion of magnetic tape deployed thereabout and having a pair of rotary transducers for scanning successive parallel tracks across the tape which is deployed about the drum. The VTR is adapted to receive a tape cartridge 1 which contains a supply reel 2 and a take-up reel 3 for transporting tape 4 therebetween. The VTR further includes a tape-loading mechanism schematically illustrated as comprising a circular support ring 8 which extends around drum 5 and which is supported for rotation. A tape engaging member 9, which is preferably in the form of an upstanding, rotatable flanged pin or roller, is mounted on support ring 8 by a suitable arm assembly. Hence, tape engaging member 9 is adapted to move with the support ring during a loading and unloading operation.

The tape loading and unloading mechanism also includes a tape guiding pin 7 projecting upwardly from one end of a support arm 6 which extends over ring 8 from a pivot pin carried by the chassis of the VTR. When cartridge 1 first is positioned, or loaded, into the VTR, support arm 6 is disposed such that tape guiding pin 7 thereon extends upwardly into an opening normally provided on the housing of cartridge 1 so as to be positioned within the housing and behind the run of tape 4, as illustrated in FIG. 1. Thus, as shown, tape 4 extends from supply reel 2 to take-up reel 3 along a run which passes near the front edge of cartridge 1.

When cartridge 1 is loaded into the VTR such that the aforedescribed operative elements of the loading mechanism included in the VTR exhibit the relationship with respect to tape 4 as shown in FIG. 1, a tape-loading operation can be performed. Thus, a user may operate a LOAD switch, or other suitable switching device, whereby a loading motor is energized so as to rotate support ring 8 in the clockwise direction, as indicated by the arrow, and also to pivot support arm 6 about the pivot axis disposed at the end thereof remote from tape guiding pin 7, whereby this support arm pivots from the position shown in FIG. 1 to the position shown in FIG. 2. A further description of the tape loading mechanism illustrated herein is described in, for example, U.S. Pat. No. 3,740,495, to Kihara, issued June 19, 1973; or in U.S. Pat. No. 3,821,805, to Serizawa, issued June 28, 1974; both of these patents being assigned to the assignee of the present invention. It will be appreciated that, as support ring 8 rotates and as support arm 6 pivots, tape 4 is withdrawn from cartridge 1 so as to be deployed about guide drum 5. In a typical VTR, tape 4 is wrapped helically about a portion of the periphery of the guide drum by an angle of at least about 180°. As illustrated in FIG. 2, tape 4 extends from supply reel 2 about tape guiding pin 7, additional guide pins on support ring 8, tape engaging member 9, and then about a portion of the periphery of guide drum 5 to take-up reel 3.

In a typical tape-loading operation, the length of tape which is withdrawn from cartridge 1 along the run illustrated in FIG. 2 is about 60 cm. The actual length of tape is fixed regardless of the amount of tape remaining on the supply reel. Furthermore, the length of time required to perform this tape-loading operation, that is, to withdraw this length of tape from cartridge 1, is a fixed amount of time. If take-up reel 3 is held stationary during this tape-loading operation, it is recognized that all of the tape which is withdrawn from cartridge 1 must be unwound from supply reel 2. It also is recognized that, even though a fixed length of tape is withdrawn from reel 2, the number of rotations of that reel during the tape-loading operation is determined by the outer diameter thereof, that is, the quantity of tape which is wound thereon. Thus, if a large amount of tape is wound upon supply reel 2, that is, if there is a large quantity of tape awaiting recording or reproduction, this reel will undergo a smaller number of angular rotations during the tape-loading operation than if there is only a small amount of tape wound thereon. Since a given length of tape is withdrawn from cartridge 1 during the tape-loading operation, and since this withdrawal of tape is performed in a constant time, the velocity at which tape 4 is withdrawn from the cartridge is a fixed velocity which, of course, may be measured and thus known. Furthermore, the thickness of the tape, which also is a fixed parameter, likewise is known. As will be described below, the amount of tape which is wound upon supply reel 2 can be determined from these known parameters, merely by detecting the number of rotations made by the supply reel during the tape-loading operation.

FIG. 3 is a schematic representation showing supply reel 2 and take-up reel 3 disposed in a loading mechanism of the type discussed previously with respect to FIGS. 1 and 2. It is assumed that some quantity of tape 4 has been wound upon take-up reel 3 prior to the loading of the tape cartridge into the mechanism. Furthermore, it is desired to determine the amount of tape which is wound upon supply reel 2 and thus is available for recording or reproduction. It is assumed that, consistent with the loading mechanisms shown in FIGS. 1 and 2, tape 4 is unwound from supply reel 2 while take-up reel 3 remains fixed. This tape is withdrawn from the tape cartridge in the direction indicated by the arrow a at a velocity v.

Let it be assumed that the radius of the supply reel (and also, for convenience, the take-up reel) is represented by $R_H$. This also is the radius of the innermost winding of tape upon the supply reel. Let it also be assumed that the radius of the outermost winding of the tape wound upon the supply reel is represented as $R_S$, which is an unknown quantity. The radius of the outermost winding of tape upon take-up reel 3 is represented as $R_T$. Now, the amount of tape which is wound upon supply reel 2 is equal to the area between the outermost radius $R_S$ and the innermost radius $R_H$, divided by the thickness of the tape. If the thickness of tape 4 is represented as $\delta$, then the total length of tape $L_S$ wound upon supply reel 2 can be mathematically expressed as:

$$L_S = \frac{\pi}{\delta} \cdot (R_S^2 - R_H^2) \tag{1}$$

The angular velocity of the supply reel, which is unknown at the present time, and which is dependent upon the amount of tape wound thereon, is represented as $\omega_S$ (radians/sec.). As is known, the linear tape velocity, or tape speed, may be expressed as:

$$v = \omega_S \cdot R_S \quad (2)$$

Let it be assumed that each rotation of supply reel 2 is detected. One embodiment of suitable detecting apparatus is described in greater detail hereinbelow. In accordance with that embodiment, a pulse is generated at each rotation of the supply reel. Thus, if a relatively small amount of tape is wound upon the supply reel, the angular velocity of that reel is high, resulting in the generation of pulses at a correspondingly higher frequency. Conversely, if a larger quantity of tape is wound upon the supply reel, then the angular velocity of that reel is reduced as tape is unwound therefrom, resulting in a corresponding reduction in the frequency of the pulses which are generated as a function of that angular velocity. Assuming that the angular velocity $\omega_S$ of supply reel 2 is such that $P_S$ pulses are generated during the loading operation, that is, while tape 4 is unwound from the supply reel, then the frequency of the pulses is related to $P_S$, and the angular velocity of the supply reel during the loading operation may be expressed as:

$$\omega_S = 2\pi P_S \quad (3)$$

The amount of tape remaining on the supply reel, in terms of time, may be represented as $T_S$. Accordingly, the amount of tape $T_S$ (in terms of recording or reproduction time) which is available is:

$$T_S = \frac{L_S}{v} \quad (4)$$

By combining equations (1)–(4), the amount of tape $T_S$ which is wound on supply reel 2 and which is available for recording or reproduction may be expressed as:

$$T_S = \frac{v}{4\pi\delta}\left[\frac{1}{P_S^2} - \left(\frac{2\pi R_H}{v}\right)^2\right] \quad (5)$$

From equation (5), it is seen that the amount of tape which remains, $T_S$, is inversely proportional to the square of the angular velocity of the supply reel, this angular velocity being represented by the number of pulses $P_S$ which is generated during the loading operation. Thus, it is appreciated that if the angular velocity (or $P_S$) is relatively low, the amount of available tape $T_S$ wound upon supply reel 2 is relatively high. However, if the angular velocity (or $P_S$) is relatively high, then the amount of tape $T_S$ which is wound upon supply reel 2 is relatively low. This, of course, is consistent with the known principle that, if tape is unwound from a reel at a constant velocity v, the angular velocity of that reel is inversely related to the useful diameter thereof, i.e., the amount of tape wound thereon.

Figure 4:
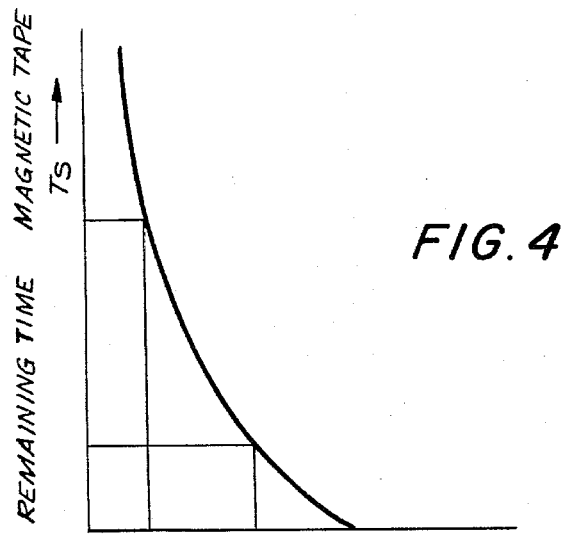
FIG. 4 is a graphical representation of the relationship between the amount of tape wound upon a reel and the angular rotation of that reel during a loading operation by the device shown in FIGS. 1 and 2.

The relationship between the angular velocity of the supply reel, or the number of rotations of that supply reel during the loading operation, i.e, during a fixed time period, and the amount of tape $T_S$ which is wound on that reel, and which thus is available for recording or reproduction, is graphically depicted in FIG. 4.

Figure 5:
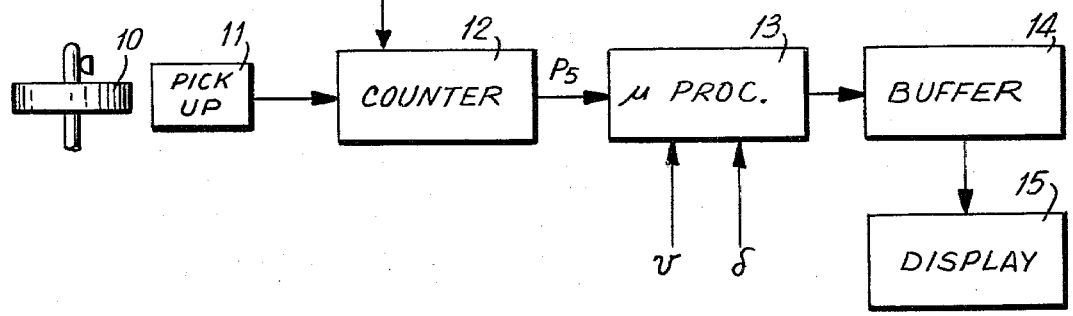
FIG. 5 is a block diagram of one embodiment of apparatus in accordance with the present invention.

FIG. 5 is a block diagram of indicator apparatus which is used to determine the quantity $T_S$ and to provide an indication of that determined quantity. The illustrated apparatus is comprised of a rotary magnetic assembly 10, a magnetic sensor, or pick-up 11, a counter 12, a micro-processor 13, a buffer circuit 14 and a display device 15. Rotary magnetic assembly 10 may comprise a wheel secured, or otherwise mechanically coupled, to the supply reel shaft, and thus rotatable at an angular velocity which is equal to or portional to the angular velocity of the supply reel. This wheel may be provided with one or more magnetic elements mounted on the periphery thereof such that this element or elements rotate at an angular velocity determined by the angular velocity of the supply reel. Magnetic sensor 11 is fixed relative to wheel 10 and is adapted to sense the rotation of each magnetic element therepast. In one embodiment thereof, magnetic sensor 11 comprises a reed switch which closes in response to each magnetic element so as to produce an output pulse. In an alternative embodiment, sensor 11 comprises a magnetic pick-up head, including a coil, which generates a pulse in response to each detected magnetic element as that element rotates past the head.

Counter 12 may comprise a conventional binary counter coupled to magnetic sensor 11 for counting the pulses generated by the sensor. Counter 12 additionally includes a reset input which is adapted to receive a LOAD signal for resetting the count thereof to an initial value, such as zero, when the user initiates a tape-loading operation, as by operating a suitable LOAD switch, or the like. The output of counter 12 is coupled to micro-processor 13. Signals corresponding to the fixed linear velocity v, and the constant tape thickness $\delta$, are supplied to the micro-processor together with the count obtained by counter 12. As is known, microprocessor 13 includes an arithmetic section which, under the control of a suitable program as will be known to one of ordinary skill in the art, the respective signals supplied to the micro-processor are combined in accordance with equation (5). Hence, the output of the arithmetic section of micro-processor 13 represents the amount of tape $T_S$, expressed in terms of time, which is wound upon the supply reel and which thus is available for recording or reproduction. As one embodiment thereof, micro-processor 13 may be a conventional Model 8080 micro-processor, manufactured by Intel Corp., Santa Clara, Calif. Of course, other models of suitable micro-processors may be used with the present invention, each micro-processor being programmed in a manner well known to one of ordinary skill in the art to carry out the mathematical process corresponding to equation (5).

The output of micro-processor 13, which is a signal corresponding to the amount of tape $T_S$ which is wound upon the supply reel, is supplied to buffer circuit 14. This buffer circuit may include a compatible interface circuit adapted to drive display device 15. In addition, the buffer circuit may convert the format of the signal supplied thereto by micro-processor 13 from one digital code to another; or, still further, the buffer circuit may convert the digital signal to a corresponding analog signal. The output of the buffer circuit is coupled to display device 15 which, for example, may comprise a suitable digital display. Thus, display device 15 may be adapted to provide a digital numerical indication, in terms of time, as to the amount of tape remaining on supply reel 2. As a further alternative, some other form of desirable visual display may be provided, such as a linear display resembling a bar-graph or any other type of characterization, representation or pictorial depiction as to the amount of tape which remains on the supply reel.

Briefly, in operation, when the user initiates the tape-loading operation, as by operating a suitable LOAD switch, a LOAD signal is supplied to counter 12 so as to reset this counter to its initial, zero count. In response to the initiation of this loading operation, support ring 8 and support arm 6 operate from the condition shown in FIG. 1 to the condition shown in FIG. 2. This operation withdraws a portion of tape 4 from cartridge 1. In the example discussed above, it is assumed that take-up reel 3 remains stationary, as by a suitable brake (not shown), and the tape is withdrawn from cartridge 1 by unwinding same from supply reel 2. Thus, as tape is withdrawn from the cartridge, supply reel 2 rotates.

Wheel 10 rotates with supply reel 2 such that the angular rotation of wheel 10 either is equal to or is proportional to the angular rotation of the supply reel. As the magnetic element or elements on wheel 10 rotate past sensor 11, the sensor generates pulses which are supplied to counter 12. Hence, the count of counter 12 is incremented in response to each pulse supplied thereto. At the completion of the loading operation, that is, at the end of the predetermined tape-loading time interval, a certain number of pulses will have been supplied to counter 12 by sensor 11. Thus, counter 12 will have been incremented to a count $P_S$. It is recognized that this count $P_S$ is a function of the angular velocity of supply reel 2. This count $P_S$, together with signals representing the constant linear velocity v of tape 4, the thickness $\delta$ of the tape and the radius $R_H$ of the innermost winding of the tape on the supply reel, all are supplied to micro-processor 13. The arithmetic section of this micro-processor, which has been programmed to carry out the mathematical expression defined by equation (5), produces a signal, such as a binary signal, a BCD signal, or other digital code signal, representing the amount of tape which is wound upon the supply reel in terms of time $T_S$. This signal is supplied to buffer circuit 14 whereat it is converted to a digital code format, or to an analog signal, or is otherwise processed by the buffer circuit so as to drive display device 15. Consequently, a suitable visual indication of the amount of time $T_S$ of available tape wound upon supply reel 2 is provided by the display device.

In the foregoing, it has been assumed that the amount of tape remaining on supply reel 2 is determined and indicated. If desired, the amount of tape which had been used previously and which thus is wound upon take-up reel 3 may be determined by, for example, subtracting the amount of remaining tape from the total capacity of the cartridge, which total capacity is, of course, known. As another alternative, during the tape-loading operation, supply reel 2 may be held stationary while tape 4 is withdrawn from cartridge 1 by unwinding take-up reel 3. If the angular velocity of the take-up reel is sensed, then equation (5) will provide an indication of the amount of tape which has been wound upon the take-up reel.

Of course, in determining the amount of tape which remains on the supply reel (or which has been used and thus is wound upon the take-up reel), it is important that the linear velocity v at which tape is withdrawn from the cartridge during the tape-loading operation be known. This parameter is fixed with respect to the particular loading mechanism which is used. Hence, if the loading mechanism differs from one VTR to another, or from one tape processing device to another, the proper signal representing the associated parameter of the subject device should be supplied to micro-processor 13. Similarly, if the VTR (or other tape processing device) is adaptable for use with tapes of different thicknesses, a signal representing the particular thickness $\delta$ of the tape being used should be supplied to the micro-processor. Also, since supply and take-up reels having various sized hubs can be used with the VTR, a signal representing the radius $R_H$ of the hub (and thus, of the innermost winding of tape) in the particular cartridge which is used also should be supplied to the micro-processor. In order to account for these various parameters, which can change from one VTR to another, it is preferred that a block 13 (FIG. 5) be comprised of a microprocessor. Nevertheless, and as is readily appreciated, any other circuitry can be used, as desired, to carry out the mathematical expression defined by equation (5). Such circuitry can be a digital implementation formed of multiplier circuits, divider circuits, and subtractor circuits. As another alternative, block 13 can be implemented by analog circuits which are adapted to carry out the indicated mathematical functions.

Thus, regardless of the amount of tape which may have been used previously, and which thus may be wound upon the take-up reel at the time that the tape cartridge is loaded into the VTR, an indication of the amount of tape which remains on the supply reel is provided rapidly, immediately upon completion of the tape-loading operation.

While the present invention has been particularly shown and described with reference to a preferred embodiment thereof, it should be readily appreciated to those of ordinary skill in the art that various changes and modifications in form and details may be made without departing from the spirit and scope of the invention. For example, the indicating apparatus of this invention need not be limited solely for application with a VTR. An indication of the amount of tape which is wound upon the supply reel or the take-up reel can be provided with respect to other types of tape processing devices wherein an initial loading operation is carried out whereby a portion of the tape wound upon a reel is withdrawn therefrom. It is intended that the appended claims include those changes and modifications which, nevertheless, are equivalent to the claimed invention.

What is claimed is:

1. Apparatus for indicating the amount of tape wound upon one reel, such as a supply reel or a take-up reel, in a two-reel cartridge, which apparatus is operative without regard to previous use of said cartridge when said cartridge is loaded into a processing device of the type which includes loading means for withdrawing a portion of the tape wound upon said one reel from said cartridge, said apparatus comprising:
    means for generating a signal representing the angular velocity of said one reel when said one reel rotates in response to the withdrawal of said tape from said cartridge;
    combining means for combining said signal with predetermined signals representing predetermined characteristics of said tape; and
    indicating means responsive to said combining means for indicating the amount of tape wound upon said one reel as a function of said generated signal.

2. The apparatus of claim 1 wherein said predetermined signals represent the linear velocity at which said tape is withdrawn from said cartridge, and the thickness of said tape.

3. The apparatus of claim 2 wherein said combining means comprises micro-processor means having an arithemetic section for determining the amount of tape wound upon said one reel in terms of time $T_S$ in accordance with the expression $$T_S = \frac{v}{4\pi\delta} \left[ \frac{1}{P_S^2} - (\frac{2\pi R_H}{v})^2 \right],$$

wherein v is said linear velocity, $\delta$ is said thickness of said tape, $P_S$ is said signal representing the angular velocity of said one reel, and $R_H$ is the diameter of the innermost winding of tape wound upon said one reel.

4. The apparatus of claim 3 wherein said means for generating said signal representing the angular velocity of said one reel comprises pulse generating means for generating pulses at a frequency determined by said angular velocity; and counting means for counting said generated pulses, whereby the count of said counting means represents said angular velocity.

5. The apparatus of claim 4 wherein said pulse generating means comprises a rotatable member rotating with said one reel, means mounted on and rotatable with said rotatable member, and sensing means for sensing said last-mentioned means and for producing a pulse in response thereto.

6. The apparatus of claim 5 wherein said means mounted on said rotatable member comprises at least one magnetic element; and said sensing means comprises a magnetic pick-up for producing a pulse when each magnetic element rotates therepast.

7. The apparatus of claim 3 wherein said indicating means comprises visual display means for displaying a visual indication of the amount of tape wound upon said one reel as a function of the time $T_S$ for said amount of tape to be exhausted.

8. The apparatus of claim 3 wherein said one reel is the supply reel.

9. The apparatus of claim 3 wherein said one reel is the take-up reel.

10. The apparatus of claim 8 or 9 wherein said processing device is a video tape recorder and/or reproducer device.

11. Apparatus for indicating in terms of time $T_S$ the amount of tape wound upon a reel, such as a supply reel or a take-up reel, when said tape is transported from said reel at a velocity v, with the radius of the innermost turn of said tape on said reel being $R_H$ and the thickness of the tape being $\delta$, said apparatus being operative without regard to previous use of the tape and comprising:
pulse generating means coupled to said reel for generating pulses at a frequency which is a function of the angular velocity of said reel;
signal generating means for generating a signal $P_S$ in response to said generated pulses, said signal $P_S$ representing the angular velocity of said reel;
means for supplying a signal representing said tape thickness $\delta$, a signal representing said tape velocity v, and a signal representing said radius $R_H$;
micro-processor means for receiving said signal $P_S$, said signal representing said thickness $\delta$, said signal representing said linear velocity v, and said signal representing said radius $R_H$, said micro-processor means including an arithmetic section for processing said signals in accordance with the mathematical expression $$T_S = \frac{v}{4\pi\delta} \left[ \frac{1}{P_S^2} - (\frac{2\pi R_H}{v})^2 \right]$$

to produce an output signal representing $T_S$; and
display means for providing a visual indication corresponding to said output signal.

12. The apparatus of claim 11 wherein said signal generating means comprises pulse counting means for counting the number of said pulses generated during a predetermined time interval to produce said signal $P_S$ corresponding to the count thereof.

* * * * *